United States Patent [19]

Parrent

[11] Patent Number: 4,887,799
[45] Date of Patent: Dec. 19, 1989

[54] APPARATUS FOR TREATMENT OF ORE PARTICLES
[75] Inventor: Kenneth G. Parrent, Golden, Colo.
[73] Assignee: Richard J. Moser, Lakewood, Colo.
[21] Appl. No.: 827,647
[22] Filed: Feb. 10, 1986
[51] Int. Cl.[4] ............................................. C22B 3/02
[52] U.S. Cl. ................................. 266/168; 75/101 R; 423/27; 423/150; 422/292; 23/293 A; 134/198
[58] Field of Search ............... 266/168, 170; 75/97 A, 75/101 R, 0.5 A, 0.5 AB; 423/27, 150; 422/292; 23/293 R, 293 A; 134/198

[56] References Cited
U.S. PATENT DOCUMENTS 2,935,394  5/1960  Hiler ................................... 75/0.5 A
3,885,017  5/1975  Robinson et al. .................. 75/101 R
3,958,947  5/1976  Robinson et al. .................. 75/101 R Primary Examiner—Robert L. Stoll
Attorney, Agent, or Firm—Dorr, Carson, Sloan & Peterson

[57] ABSTRACT

A high-velocity jet of solvent is introduced through a nozzle into one end of a passage. A slurry of ore particles is feed into the passage through a narrow inlet port extending across the width of the passage in front of the nozzle of the jet. The resulting high-energy impact of the solvent jet on the ore particles causes a rapid, turbulent flow of the mixture of solvent and ore particles through the remaining length of the passage and into a mixing chamber. This flow impinges on the back wall of the mixing chamber further increasing abrasion and mixing between the solvent and ore particles.

6 Claims, 1 Drawing Sheet

APPARATUS FOR TREATMENT OF ORE PARTICLES

FIELD OF THE INVENTION

The present invention relates generally to the field of treatment of ores with solvents or lixiviants to extract mineral values. More specifically, the present invention is an apparatus for treatment of a slurry of ore particles by a high-pressure jet of solvent.

BACKGROUND OF THE INVENTION

The extraction of metals from ores by means of appropriate solvents has been practiced for many years. A number of prior art methods involve leaching of crushed ores held in tanks or ponds in which the solvent is sprayed over the ore. The prior art also teaches the effectiveness of the solvent can be enhanced by mechanical agitation or mixing of the ore/solvent slurry by means of mixing augers, propellers and by rotating drums, cylinders and tanks. The prior art also teaches that increased temperature and pressure can enhance the effectiveness of the solvent.

In contrast, the principal of the present invention involves use of a high-velocity jet of solvent acting directly upon the ore particles to both greatly accelerate processing rates for leaching of ore, and to substantially increase the effective recovery of mineral values by the solvent.

SUMMARY OF THE INVENTION

The present invention comprises an apparatus for treatment of ore particles by a high-velocity jet of solvent. The jet of solvent is introduced through a nozzle at one end of a passage. A slurry of ore particles is fed into the passage through a narrow inlet port extending across the width of the passage in front of the jet. The mixture of solvent and ore particles is carried along the passage and into a mixing chamber. The mixture strikes the back wall of the mixing chamber and is deflected into the remainder of the mixing chamber for further mixing and circulation. The mixture is then removed for subsequent separation of the tailings, and processing of the enriched solvent by conventional means.

One principle object of the present invention is to provide an apparatus suitable for rapidly extracting mineral values from ores. A second object is to provide an apparatus to enhance the effective rate of recovery of mineral values from ores. The present invention is also comparatively compact and more easily transported than leaching apparatus conventionally used in the mining industry. Finally, the present invention may require substantially less energy than conventional heap leaching techniques due to dramatically accelerated processing rates that eliminate the need to spray, and circulate solvent for extended periods of time.

DESCRIPTION OF THE DRAWINGS

The present invention may be best understood in conjunction with the accompanying drawings, in which.

DETAILED DESCRIPTION OF THE INVENTION

Figure 1:
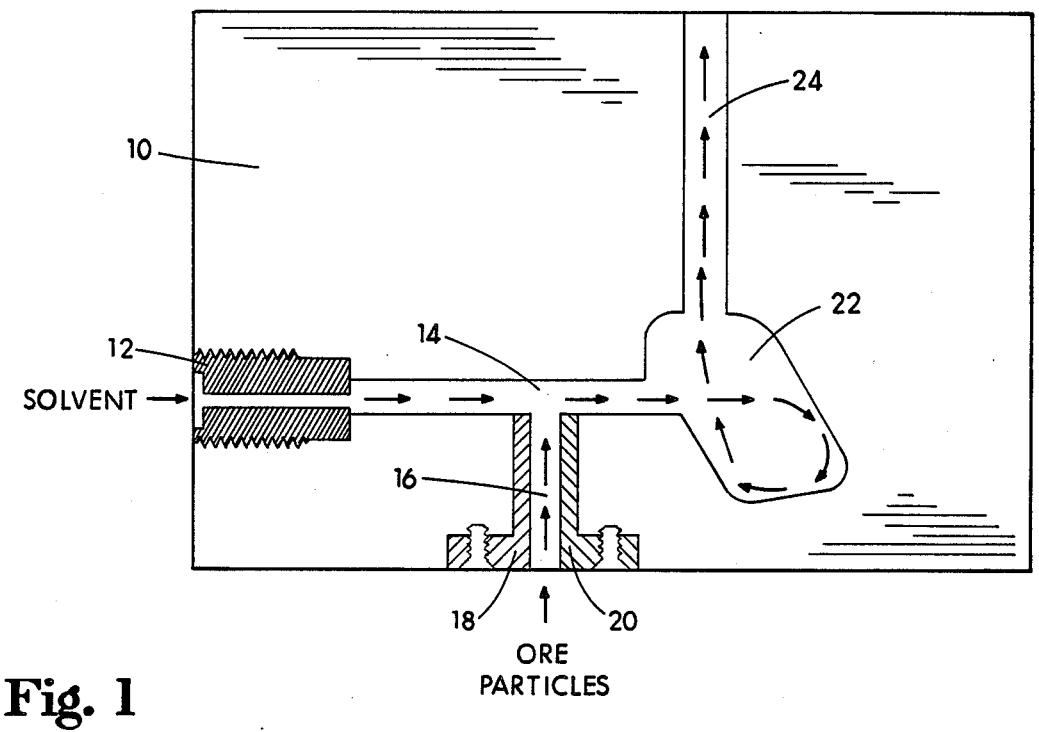
FIG. 1 is a cross-sectional side view of the present invention.
Figure 2:
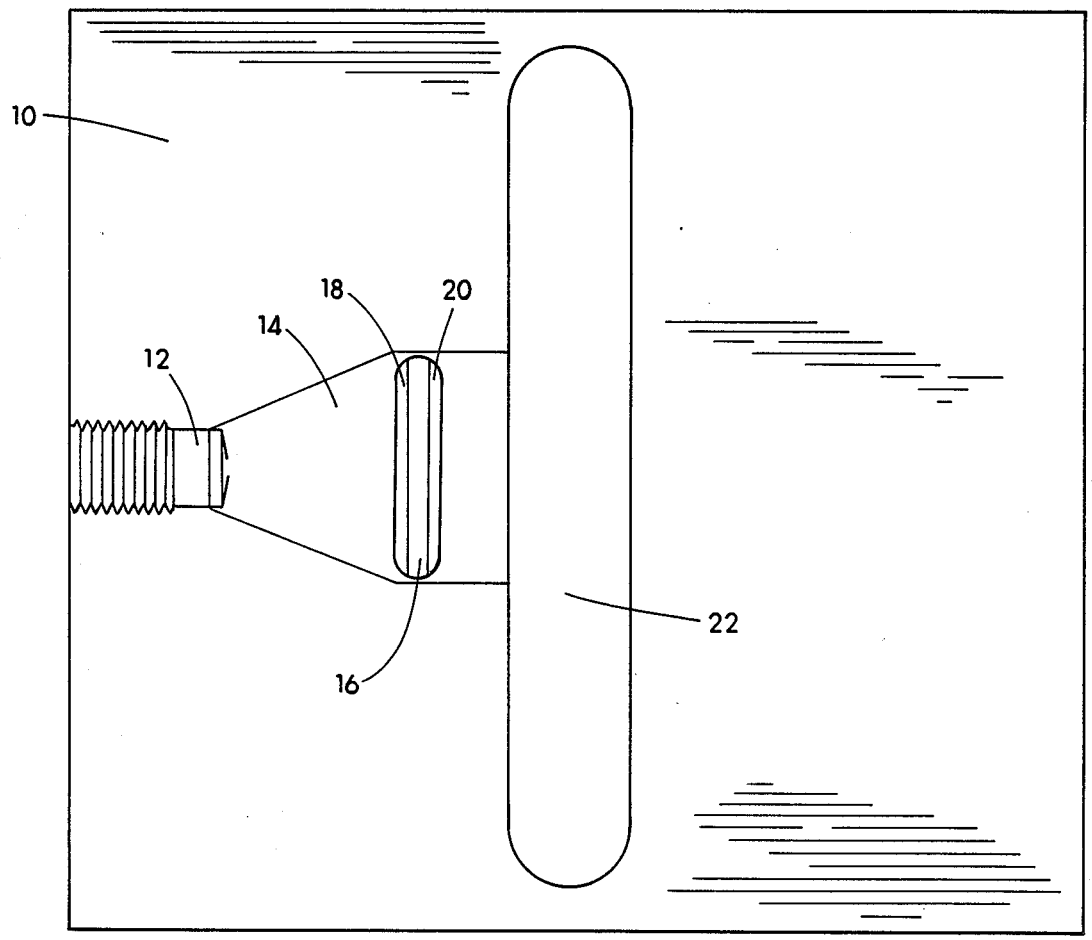
FIG. 2 is a cross-sectional top view of the present invention taken along the horizontal plane of the solvent jet and the passage.

Turning to FIG. 1, the apparatus is shown generally as 10. In operation, solvent is pumped under high-pressure (approximately 1,000 psi to 100,000 psi) through a jet or nozzle 12 into a central passage 14 extending along the axis of the jet. In FIG. 1, for example, the jet 12 extends horizontally from an exterior surface of a block of steel or other high strength material used to house the apparatus. The passage 14 extends axially from the nozzle in a horizontal direction into the block. As most clearly shown in the top cross-sectional view of FIG. 2, the passage 14 widens in a horizontal plane away from the nozzle.

A slurry of ore particles is introduced into the passage via an inlet port 16 extending from the bottom of the apparatus. The upper end of the inlet port is a narrow slot extending substantially across the entire width of the passage 14. The width of the inlet port slot can be adjusted by means of a sleeve or shims 18 and 20 to: (a) accommodate a particular ore particle size; (b) achieve a desired feed rate; or (c) adjust the point of impact between the solvent jet and the ore particles.

As ore particles emerge from the inlet port into the passage, they are subjected to high-energy impact by the jet of solvent. The result is an extremely high-velocity fluid stream capable of fracturing and disassociating any mineral structure or crystaline latice of the ore particles. In addition to the direct action of the kinetic energy of the jet upon the ore particles, a highly turbulent flow is induced in the slurry resulting in further high-energy contact and abrasion between ore particles.

The mixture of solvent and ore particles is carried along the remaining length of the passage in rapid, turbulent flow into a shallow, elongated mixing chamber 22. This flow impinges on the back wall of the mixing chamber, shattering and fracturing the ore particles against the wall and increasing the mixing and abrasion between the solvent and ore particles. As shown in FIG. 1, the back wall of the mixing chamber can be angled or contoured to obtain a desired flow pattern to enhance mixing and turbulent flow within the chamber. The mixing chamber may be contoured or shaped to create a cross-flow, as shown in FIG. 1, to further increase abrasion and fracturing of the ore particles as the streams collide. The mixture of solvent and ore particles is withdrawn through an exit port 24 for subsequent separation of tailings and processing of the enriched solvent to recover contained values.

The apparatus as described above can be made extremely compact, having dimensions of only a few inches. In situations where large quantities of ore must be processed, a number of these individual units can be operated in parallel. Thus, the number of units can be tailored to meet the needs of the specific operation. In addition, in the event of a malfunction or break down, the specific unit at fault can quickly be replaced without affecting the remaining units.

I claim:

1. An apparatus for treatment of ore particles by solvent, comprising:
    (a) A nozzle to produce a high-pressure jet of solvent;
    (b) A passage extending axially from said nozzle;
    (c) An inlet port allowing ore particles to be introduced into said passage;

(d) A mixing chamber at the end of the passage opposite from the nozzle.

2. The apparatus of claim 1, wherein the passage widens in a horizontal plane away from the nozzle.

3. The apparatus of claim 2 wherein the inlet port comprises a narrow slot extending across the width of the passage.

4. The apparatus of claim 3 further comprising a number of shims that can be inserted into the inlet port to adjust the width and position of the inlet port.

5. The apparatus of claim 1 wherein the back wall of the mixing chamber opposite the end of the passage is contoured to deflect the mixture of solvent and ore particles emerging from the passage into the mixing chamber 6. An apparatus for treatment of ore particles by solvent, comprising:
   (a) A nozzle producing a horizontal high-pressure jet of solvent;
   (b) A passage extending axially from said nozzle, widening in a horizontal plane along the length of the passage;
   (c) An inlet port allowing ore particles to be introduced into the passage, comprising a slot extending across the width of the passage; and
   (d) A mixing chamber at the end of the passage opposite from the nozzle.

* * * * *